(12) United States Patent
Gao et al.

(10) Patent No.: US 11,521,505 B2
(45) Date of Patent: Dec. 6, 2022

(54) METHOD FOR INPUTTING CHINESE CHARACTERS USING MORTISE AND TENON JOINT STRUCTURES FOR CHINESE CHARACTERS FORMED BY BUILDING MEMBERS

(71) Applicant: CHONGQING HANZIHUI EDUCATIONAL TECHNOLOGY INSTITUTE CO., LTD, Chongqing (CN)

(72) Inventors: Xiaoming Gao, Chongqing (CN); Anlan Gao, Zhejiang (CN)

(73) Assignee: CHONGQING HANZIHUI EDUCATIONAL TECHNOLOGY INSTITUTE CO., LTD, Chongqing (CN)

( * ) Notice: Subject to any disclaimer, the term of this patent is extended or adjusted under 35 U.S.C. 154(b) by 136 days.

(21) Appl. No.: 17/210,485

(22) Filed: Mar. 23, 2021

(65) Prior Publication Data
US 2021/0209958 A1   Jul. 8, 2021

Related U.S. Application Data

(60) Division of application No. 16/558,046, filed on Aug. 31, 2019, now Pat. No. 11,030,910, which is a continuation of application No. PCT/CN2018/074642, filed on Jan. 31, 2018.

(30) Foreign Application Priority Data

Mar. 9, 2017  (CN) .......................... 201710138590.8

(51) Int. Cl.
G09B 1/10  (2006.01)
G09B 19/06  (2006.01)

(52) U.S. Cl.
CPC .............. *G09B 1/10* (2013.01); *G09B 19/06* (2013.01)

(58) Field of Classification Search
CPC .................................. G09B 19/06; G09B 1/40
USPC ......................................................... 434/157
See application file for complete search history.

(56) References Cited

U.S. PATENT DOCUMENTS

| | | | | |
|---|---|---|---|---|
| 5,360,343 A | * | 11/1994 | Tang | G06F 3/018 |
| | | | | 715/264 |
| 2011/0159466 A1 | * | 6/2011 | Chia | G09B 19/06 |
| | | | | 434/157 |
| 2016/0239099 A1 | * | 8/2016 | Lo | G06F 3/0233 |

FOREIGN PATENT DOCUMENTS

| | | |
|---|---|---|
| CN | 86207740 U | 9/1987 |
| CN | 2374933 Y | 4/2000 |
| CN | 101980319 A | 2/2011 |
| CN | 105912134 A | 8/2016 |
| CN | 106802725 A | 6/2017 |

(Continued)

*Primary Examiner* — Thomas J Hong

(57) ABSTRACT

Disclosed are mortise and tenon joint structures for Chinese characters formed by building members having the same or different configurations, and a method for inputting Chinese characters by using the building members. The Chinese characters are de-structured such that each Chinese character consists one or more radicals which are formed by the mortise and tenon joint structures or variants thereof. The variants of the mortise and tenon joint structures are formed by shift, rotation or combination of shift and rotation of the building members of the mortise and tenon joint structures. This establishes an inputting method between the Latin letters and Chinese characters.

9 Claims, 14 Drawing Sheets

(56) References Cited

FOREIGN PATENT DOCUMENTS

CN     206711038 U    12/2017
WO    2015122597 A1    8/2015

* cited by examiner

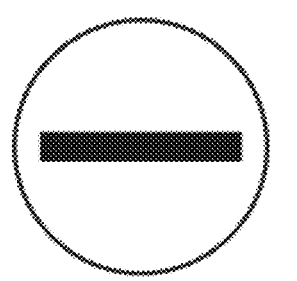 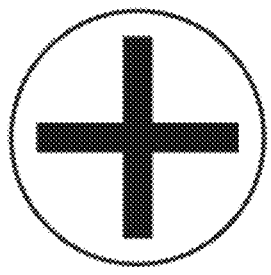 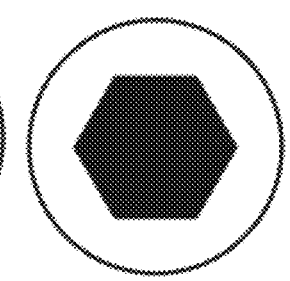
FIG. 6a    FIG. 6b    FIG. 6c
 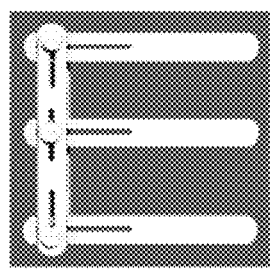 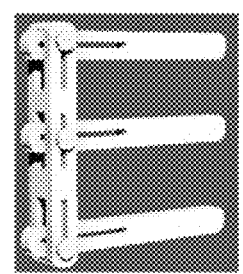
FIG. 7

| Arabic numerals | Mortise and tenon joint structures of Chinese characters | | | | | | | | |
|---|---|---|---|---|---|---|---|---|---|
| 1 | I | | | | | | | | |
| 2 | Z | A | C | F | H | K | N | U | Y |
| 3 | E | W | M | | | | | | |
| 4 | X | h | f | t | | | | | |
| 5 | S | S | | | | | | | |
| 6 | b | d | | | | | | | |
| 7 | ⌐ | L | T | V | X | V | Y | L | J |
| 8 | B | B | θ | θ | K | | | | |
| 9 | P | R | | | | | | | |
| 0 | □ | D | G | Q | | | | | |

FIG. 12

| Chinese numerals | Mortise and tenon joint structures of Chinese characters | | | | | | | | |
|---|---|---|---|---|---|---|---|---|---|
| 一 | I | | | | | | | | |
| 二 | J | L | T | Y | | | | | |
| 三 | A | E | F | H | N | U | Y | Z | E |
| 四 | ☐ | D | G | Q | K | B | P | R | X |
| 五 | S | B | Q | h | | | | | |
| 六 | K | b | | | | | | | |
| 七 | T | F | L | J | | | | | |
| 八 | M | W | V | V | W | | | | |
| 九 | i | Z | | | | | | | |
| 十 | X | | | | | | | | |

| Capital and lowercase Latin letters | Joint structures corresponding to capital and lowercase Latin letters | Variants of the joint structures to form the radicals of the Chinese characters |
|---|---|---|
| A a | △ ㄨ | 乂 厶 ㄥ |
| B b | B ь | 日 目 |
| C c | Ɛ ㄈ | ㄥ 亻 ㄱ ㄇ ㄩ |
| D d | ロ d | 夕 月 ロ ロ |
| E e | Ε Ξ | 山 Ξ Ε 巾 山 乡 |
| F f | F ᵵ | 匕 土 圡 干 圡 ㄣ |
| G g | ㄷ 目 | ㄅ ト ㅗ ㄥ ㄅ |
| H h | H ᴴ | ㄅ 八 廾 士 干 圡 ㄣ |
| I i | I i | 一 氵 ㄣ |
| J j | J J | フ ㄱ ㄱ ㄴ ㄈ |
| K k | K K | ㄨ ㄨ ㄨ |
| L l | L L | 厂 厂 ㄴ ㄱ ㄱ |
| M m | M M | ㄣ 彡 ㄣ W 山 巾 ㄣ |
| N n | N ᴺ | ㄣ 亻 ㄥ ㄱ ㄇ ㄩ |
| O o | ロ 日 | 日 田 |
| P p | P P | ロ ロ ロ ㄅ |
| Q q | Q ᵠ | 田 |

FIG. 16A

| R r | | |
|---|---|---|
| S s | | |
| T t | | |
| U u | | |
| V v | | |
| W w | | |
| X x | | |
| Y y | | |
| Z z | | |

FIG. 16B

METHOD FOR INPUTTING CHINESE CHARACTERS USING MORTISE AND TENON JOINT STRUCTURES FOR CHINESE CHARACTERS FORMED BY BUILDING MEMBERS

CROSS-REFERENCE TO RELATED APPLICATIONS

This application is a divisional application of U.S. application Ser. No. 16/558,046, filed on Aug. 31, 2019, which is a continuation of International Application No. PCT/CN2018/074642 with a filing date of Jan. 31, 2018 claims the benefit of priority from Chinese Application No. 201710138590.8, filed on Mar. 9, 2017. The content of the aforementioned applications, including any intervening amendments thereto, are incorporated herein by reference.

TECHNICAL FIELD

The present application relates to input and object teaching of Chinese characters using an input interface, more particularly, to a Chinese character structuring member, a system of mortise and tenon joint structures of Chinese characters formed by the Chinese character structuring member and a method for inputting Chinese characters, in which Chinese characters are taught using letters and numerals, and the teaching, writing and input of the Chinese characters are internationalized in displays of Chinese character structures and teaching of Chinese characters.

BACKGROUND OF THE INVENTION

Since 1980s, there are hundreds of teaching methods for Chinese characters in the field of Chinese information processing. However, the Chinese characters are taught using letters and numerals and the teaching and writing of the Chinese characters are internationalized for the first time in the present invention, i.e., shapes of strokes of the Chinese characters are converted into that of Latin letters to help students whose first language is Latin to enhance their memory in learning Chinese, providing them with letter basis for memory. There are hundreds of thousands of methods using Chinese character coding, which can be divided into three categories: phonetic coding, shape coding and a combination thereof. The current status of the input methods of the Chinese characters is that despite the advantages of the mentioned input methods, a great difficulty has been brought to users due to the disadvantages of the mentioned input methods, such as inaccurate pronunciations, too many homophones and too many radicals of the complicated Chinese characters to remember.

The Chinese character is greatly destroyed as the result of pursuing the rapid input, also the rules of the radicals are hard to remember due to the meaning of the Chinese character is neglected, which caused a huge waste of many resources when inputting or learning Chinese characters, such as human resource, material resources and financial resources.

SUMMARY OF THE INVENTION

A Chinese character structuring member, a system of mortise and tenon joint structures of Chinese characters formed by the Chinese character structuring member and a method for inputting the Chinese characters are provided in the present invention to overcome technical problems in the prior art.

In a first aspect, provided is a Chinese character structuring member, comprising a plurality of entity components of different lengths, and the entity components of the Chinese characters adopt one of the following three structures:

a first structure provided with a connecting mechanism at the middle and/or one end or both ends of the entity component configured to join with other entity components of the Chinese characters;

a second structure provided with a connecting mechanism extending from one end of the entity component to the other end of the entity component without exceeding the two ends; and a third structure provided with at least one connecting mechanism on the entity component of the Chinese character that comprises a plurality of sub entity members connected end to end and rotatable at a joint.

The structures corresponding to Latin letters or numerals are configured by the Chinese character structuring member of the present invention, and the core of the present invention is that radicals of Chinese characters are formed (written) by moving and rotating the connecting mechanism of the mortise and tenon joint structures to form all Chinese characters. The present invention breaks the barrier among two symbol systems, and provides new relationships among the letters, numerals and Chinese characters, and provides the (Gao's) artistic movable fonts using the mortise and tenon joint structures of the Chinese characters for the Latin letters for the purpose of learning and inputting Chinese characters.

In some embodiments, the first structures, the second structures and the third structures with no connecting mechanism are provided to form simple characters.

In some embodiments, part or all of the entity components of the Chinese characters are formed by joining pieces which comprise:

(1) a joining piece provided with a joining unit at one end and being smooth at the other end, wherein no connecting mechanism is arranged on a surface of the joining piece;

(2) a joining piece provided with a joining unit at one end and being smooth at the other end, wherein the connecting mechanism is arranged on the surface of the joining piece;

(3) a joining piece provided with joining units at both ends, wherein no connecting mechanism is arranged on a surface of the joining piece; and (4) a joining piece provided with the joining unit at both ends, wherein the connecting mechanism is arranged on the surface of the joining piece.

The joining piece is beneficial to adjust the length of the entity components of the Chinese characters, and the design for the length of the entity components of the Chinese characters is simplified, so that the Chinese characters are formed through a small number of entity components of the Chinese characters.

In some embodiments, an entity component of the Chinese character is set to be a standard entity component, and lengths of other entity components of the Chinese characters are 0.25-4 times longer than that of the standard entity component of the Chinese character, so that characters of all proportions are formed.

In some embodiments, the connecting mechanism is a nylon fastener, a magnet or a mortise and tenon joint structure, by which different entity components of the Chinese characters are connected. The entity components of the Chinese characters are connected through the adopted mortise and tenon joint structures which are provided with a mortise, a slot, a groove, or a protrusion or a groove for engagement. A rabbet, a mortise, a slot or a groove also can be adopted by part entity components of the Chinese characters to realize the connection between such entity components with linch pin, and specifically, the following structures can be adopted: a mortise and tenon joint using tenons of two different lengths, a mortise and tenon joint using dowel, a dovetail joint, a haunch mortise and tenon joint, a mortise and tenon joint using a through supporting piece, a mortise and tenon joint using three sloped tenons, and a mortise and tenon joint with chuck tenon. The mortise and tenon joint is not only an ancient construction technique, but a cultural patterns formed in the history. Through the separation, connection and insertion of members in the construction, the most suggestive and perceptive symbols in Chinese classical culture are materialized into a visual language of modern art that conforms to the Latin alphabet and brings the Chinese character to live by showing the spirit hidden inside Chinese character.

In some embodiments, when the middle and one end of the entity component of the Chinese character are provided with a mortise, or a slot, or a nylon fastener, or a magnet, or when the middle and both ends of the entity component of the Chinese character are provided with a mortise, a slot, a groove, a nylon fastener, or a magnet, the mortise, the slot, the groove and the nylon fastener are integrated as one, which realizes the diversification of the entity components of Chinese characters.

In some embodiments, the entity component of the Chinese character is two-dimensional or three-dimensional.

When the entity component of the Chinese character is two-dimensional, the mortise, the slot and the groove penetrate such entity component, and the nylon fastener, the magnet, the groove or protrusion for engagement are arranged on the surface of the entity component.

When the entity component of the Chinese character is three-dimensional, the mortise and the slot are arranged on the surface of the entity component and are carved into the entity component with a certain depth, or the mortise, the slot and the groove are arranged on four sides of the entity component, or the mortise, the slot and the groove are arranged on and penetrate two opposite sides of the entity components; the nylon fastener, the magnet and the groove or protrusion for engagement are arranged on at least one side of the three-dimensional entity component of the Chinese character.

A nail-shaped component is also provided, and both the two-dimensional entity components of the Chinese characters and the three-dimensional entity components of the Chinese characters are connected and/or fixed by the nail-shaped component.

In some embodiments, the two-dimensional entity components of the Chinese characters are rectangles, and specifically being rectangles with equal width or unequal widths, or rounded rectangles. The three-dimensional entity components of the Chinese characters are cylinders, and specifically being cylinders with equal thickness or unequal thicknesses, or a square cylinder, such as cylinders with equal thickness. The structure of the entity components of the Chinese characters is completely different from the structure of the radical for forming the Chinese character.

For the purpose of learning and application, the two-dimensional (or three-dimensional) Chinese characters are formed by arranging the entity components of the two-dimensional (or three-dimensional) Chinese characters.

In some embodiments, a connecting bolt is further provided, and when the connecting mechanism is a mortise, a slot or a groove, the connecting bolt passes through the connecting mechanisms of two or three entity components of the Chinese characters to connect these entity components together, and the end of connecting bolt protrudes from or is flush with the entity components of the Chinese characters. The Chinese character formed by the connecting bolt is easily hanged when the connecting bolt protrudes from the entity components of the Chinese characters.

In some embodiments, the entity component of the Chinese character is made of wood, plastic, metal, glass or any combination thereof. Various materials help to realize the mortise and tenon joint structures and diverse displays.

In a second aspect, provided is a system of Chinese characters formed by mortise and tenon joint structures. Part or all of capital Latin letters and/or part or all of lowercase Latin letters are squared according to proportions of Chinese characters, and part or all of the squared strokes of the Chinese characters are stacked, overlapped or inserted with each other at the mortise and tenon joint of the stroke members to form the mortise and tenon joint structures of Chinese characters for the Latin letters; or part or all of the Arabic numerals of 0-9 are squared according to the proportions of the Chinese characters, and part or all of the squared strokes of the Chinese characters are stacked, overlapped or inserted with each other at the mortise and tenon joint of the strokes to form the mortise and tenon joint structures of Chinese characters for the Arabic numbers; or part or all of the Chinese numerals of 1-10 are squared according to the proportions of Chinese characters, and part or all of the squared strokes of the Chinese characters are stacked, overlapped or inserted with each other at the mortise and tenon joint of the strokes to form the mortise and tenon joint structures of Chinese characters for the Chinese numerals.

The system of the mortise and tenon joint structures of the Chinese characters configures and displays the Chinese characters through squaring the Latin letters or numerals. The Latin letters and numerals are squared by the entity components of the Chinese characters using the mortise and tenon joint structures of different lengths, which are further used to form the Chinese characters. Therefore, the connection between the Latin letters and numerals that are commonly used by foreigners and the Chinese character is built by such configuration that is different from the traditional configuration of the Chinese character using the radicals.

In some embodiments, the squared strokes of the Chinese characters are entity components for constituting the Chinese character structures.

In some embodiments, part or all of strokes of ancient Chinese characters are squared according to the proportions of the Chinese characters, and part or all of the squared strokes of the Chinese characters are stacked, overlapped or inserted with each other at the mortise and tenon joints of part or all strokes to form mortise and tenon joint structures of Chinese characters for ancient Chinese characters. Therefore, the configuration and display of the Chinese character are realized by the ancient Chinese characters.

In some embodiments, a stroke means that the writing direction is oriented in one direction with no angular bending; or the writing direction is bent with at least one angle.

In some embodiments, a first connecting component and a second connecting component are arranged on the mortise and tenon joint structures of the Chinese characters (i.e. the mortise and tenon joint structures of the Chinese characters for the Latin letters or numerals). Two squared strokes of the mortise and tenon joint structures of the same Chinese characters are joined by the first connecting component, and the two squared strokes are rotatable around a joint center of the first connecting component, and different mortise and tenon joint structures of the Chinese characters are in fixed connection by the second connecting component.

Two squared strokes of the mortise and tenon joint structures of the same Chinese characters are joined by the first connecting component, and the two squared strokes are rotatable around a joint center of the first connecting component, which realizes the configuration and display of the Chinese characters by mirroring, reversing and rotating the formed structure.

In some embodiments, a third connecting component is further provided to connect a structure formed by the second connecting component with other mortise and tenon joint structures of different Chinese characters in fixed connection. The configuration and display of complicated Chinese characters are realized by the third connecting component.

In some embodiments, the first connecting component, the second connecting component and the third connecting component are a recess or a protrusion for engaging a mortise, a slot, or a groove, a connecting bolt, a magnet or a nylon fastener. A nail-shaped component is further provided to connect and/or fix the Chinese character structure and the entity components of the Chinese characters. The diversity of the combination is realized by various connecting components.

In some embodiments, when the connecting bolt is used as a connecting component in the mortise and tenon joint structures of the Chinese characters, part or all of the squared strokes of the Chinese characters are provided with a straight slot on the connecting component, and a joint between the squared strokes of Chinese characters is movable along and/or rotatable around the straight slot of the squared strokes of the Chinese character connected thereto. Part squared strokes of the Chinese characters are moved to realize the configuration and display of different Chinese characters.

In some embodiments, an extra stroke is further provided. The extra stroke is detachably connected to the squared strokes of the Chinese characters, and end faces of the extra strokes and the squared strokes of the Chinese characters are same in size. The configured Chinese characters are conformed to the commonly used Chinese character structure through the extra stroke.

In a third aspect, provided is a method for inputting Chinese characters using mortise and tenon joint structures of Latin letters or numerals, comprising:

squaring all strokes of the Latin letters or the numerals according to proportions of Chinese characters;

stacking, overlapping and inserting part or all of the squared strokes to form mortise and tenon joint structures of Chinese characters; and inputting the Chinese characters according to Chinese character structures and a mirror image, a reverse image and a rotation structure thereof;

wherein the Latin letters are in one-to-one correspondence with the mortise and tenon joint structures for the Latin letters, and/or the numerals are in one-to-one correspondence with the mortise and tenon joint structures for the numerals; the Latin letters comprise capital Latin letters and/or lowercase Latin letters; a corresponding relationship between the capital Latin letters and the mortise and tenon joint structures for the Latin letters is shown in FIG. 10;

a corresponding relationship between the lowercase Latin letters and the mortise and tenon joint structures for the Latin letters is shown in FIG. 11;

a corresponding relationship between Arabic numerals and the mortise and tenon joint structures for the Arabic numerals is shown in FIG. 12; and a corresponding relationship between Chinese numerals and the mortise and tenon joint structures for the Chinese numerals is shown in FIG. 13.

The Chinese characters are conveniently and quickly input by the input method, which breaks the barrier among the symbol systems and provides new relationships among the letters, numerals and Chinese characters, and provides the (Gao's) artistic movable font using the mortise and tenon joint structures of the Chinese characters for the Latin letters for the purpose of inputting and learning Chinese characters.

When inputting one of the capital Latin letters C, F, H, K, N, U, Y and Z, a Chinese character structure corresponding to the capital Latin letter A is displayed.

When inputting one of capital Latin letters G, M, O, W, and P, a Chinese character corresponding to the capital Latin letter D is displayed.

When input the capital Latin letter S, a Chinese character structure corresponding to the capital Latin letter E is displayed.

When inputting one of the capital Latin letters L, T, V, and X, a Chinese character structure corresponding to the capital Latin letter J is displayed.

When input the capital Latin letter R, a Chinese character structure corresponding to the capital Latin letter Q is displayed.

When inputting one of the lowercase Latin letters c, f, h, 1, n, t, u and z, a Chinese character structure corresponding to the lowercase Latin letter a is displayed.

When inputting one of the lowercase Latin letters d, p, m and w, a Chinese character structure corresponding to the lowercase Latin letter b is displayed.

When inputting one of the lowercase Latin letters o, s and k, a Chinese character structure corresponding to the lowercase Latin letter e is displayed.

When inputting one of the lowercase Latin letters r, v, x and y, a Chinese character structure corresponding to the lowercase Latin letter j is displayed.

Thus, the Chinese characters are input in multiple ways by the method of the present invention.

In some embodiments, different Chinese characters structures are different in color, so that the configuration of Chinese characters are easy to be recognized and the learning for Chinese characters are promoted.

In some embodiments, the Chinese characters associated with multiple interpretations thereof are stored in a database; when inputting the Chinese characters or any of the interpretations, the interpretations and the Chinese characters are di splayed on a display.

The inspiration of designing a rotatable mortise and tenon joint between the structuring members of the Chinese characters is obtained from the research of the origin and the branch evolution of the east and west characters, as well as the development and changes of the alphabetic characters and hieroglyphics, especially the Cubism of the art history and the mortise and tenon joint structure of China, which will form the needed radicals for Chinese character forming. The two-dimensional symbol is converted to the three-dimensional symbol which breaks the barrier among the symbol systems and provides new relationships among the letters, numerals and Chinese characters. The (Gao's) artistic movable font with the mortise and tenon joint structure of the Chinese character of the squared Latin letters is invented for the purpose of inputting and learning Chinese character. The present invention will described as follows, from which additional aspects and advantages of the present invention will be understood or become apparent.

BRIEF DESCRIPTION OF THE DRAWINGS

The present invention will be described with reference to the accompanying drawings, from which the above and/or additional aspects and the advantages of the present invention will be readily understood and become more apparent.

FIGS. 6a-6c are schematic diagrams of a third connecting component according to the present invention;

FIG. 7 is a schematic diagram of a mortise and tenon joint structure formed by the entity components of the Chinese characters according to an embodiment of the present invention;

FIG. 10 shows a corresponding relationship between capital Latin letters and mortise and tenon joint structures for the Latin letters;

FIG. 11 shows a corresponding relationship between lowercase Latin letters and the mortise and tenon joint structures for the Latin letters;

FIG. 12 shows a corresponding relationship between Arabic numerals and the mortise and tenon joint structures for the Arabic numerals;

FIG. 13 shows a corresponding relationship between Chinese numerals and the mortise and tenon joint structures for the Chinese numerals;

FIG. 14 shows a corresponding relationship between capital Latin letters and the mortise and tenon joint structures for squared Latin letters;

FIG. 15 shows a corresponding relationship between lowercase Latin letters and the mortise and tenon joint structures for the squared Latin letters; and FIGS. 16A-16B show a corresponding relationship among the Latin letters, the mortise and tenon joint structures for the Latin letters and variants of the mortise and tenon joint structures, in which FIG. 16A illustrates the Latin letters A(a) to Q(q) and corresponding mortise and tenon joint structures and variants thereof; and FIG. 16B illustrates the Latin letters R(r) to Z(z) and corresponding mortise and tenon joint structures and variants thereof.

DETAILED DESCRIPTION OF EMBODIMENTS

Figure 1A:
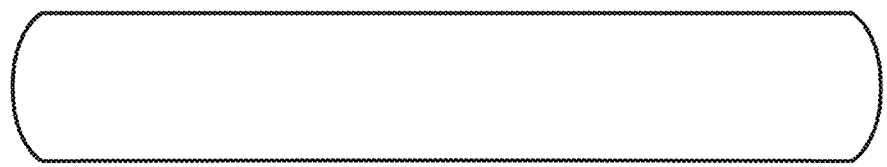
FIGS. 1a-1g are schematic diagrams of entity components of Chinese characters according to an embodiment of the present invention.
Figure 1B:
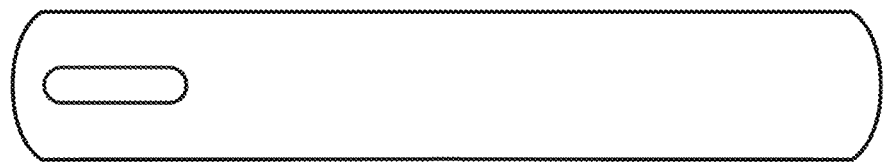
Figure 1C:
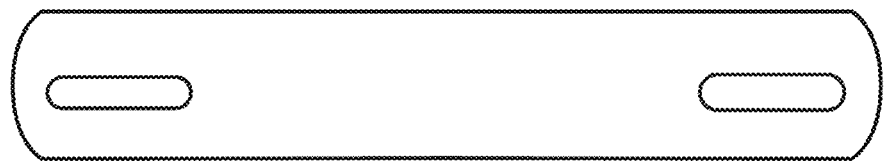

The embodiments of the present invention are described in detail below with reference to the accompanying drawings, where the same or similar reference numerals refer to the same or similar elements or elements having the same or similar functions. The embodiments described below with reference to the accompanying drawings are intended to be illustrative of the present invention and are not to limit the scope of the present invention.

It should be noted that in the description of the present invention, unless otherwise specified and limited, the terms "mounted", "attached", and "connected" should be interpreted expansively, which could be a mechanical connection or an electrical connection, or could be internal connection between two members, also could be direct connection or indirect connection through an media. For the skilled in the art, the specific meanings of the above terms may be understood according to specific circumstances.

As shown in FIGS. 1a-1g and 2a-2g, illustrated is a Chinese character structuring member, which comprises a plurality of entity components of different lengths, and the entity components of the Chinese characters adopt one of the following three structures:

a first structure (shown in FIGS. 1b-1f) provided with a connecting mechanism at the middle and/or one end or both ends of the entity component of the Chinese characters to join with other entity components of the Chinese characters;

a second structure (shown in FIG. 1g) provided with a connecting mechanism extending from one end of the entity component to the other end of the entity component without exceeding the two ends;

a third structure (shown in FIGS. 2a-2g) provided with at least one connecting mechanisms on the entity component of the Chinese character that comprises a plurality of sub entity members connected end to end and rotatable at the joint; and a fourth structure provided with connecting mechanisms which are equally or unequally spaced on the entity component of the Chinese character extending from one end of the entity component to the other end of the entity component for connections of different entity components.

In this embodiment, the entity components of the Chinese characters are in a straight or curved structure.

In this embodiment, as shown in FIG. 1a, the first structures, the second structures and the third structures with no connecting mechanism are provided. In the embodiment, as shown in FIGS. 3a-3g and 4a-4g, part or all of the entity components of the Chinese characters are formed by joining pieces which comprise at least the following forms:

(1) a joining piece provided with a joining unit at one end and being smooth at the other end (i.e., no joining unit is arranged on a surface of that end), wherein no connecting mechanism is arranged on a surface of the joining piece;

(2) a joining piece provided with a joining unit at one end and being smooth at the other end, wherein the connecting mechanism is arranged on the surface of the joining piece;

(3) a joining piece provided with joining units at both ends, wherein no connecting mechanism is arranged on the surface of the joining piece; and (4) a joining piece provided with the joining unit at both ends, wherein the connecting mechanism is arranged on the surface of the joining piece.

As shown in FIGS. 3a-3g and 4a-4g, an arbitrary mortise and tenon joint is adopted by the present invention to connect the joining pieces, and the shape of the mortise and tenon joint could be but not limited to a rectangle, a wedge, or a sphere. The joining piece is beneficial to adjust the length of the entity component of the Chinese character, and the design for the length of the entity component of the Chinese character is simplified, so that the Chinese characters are formed through a small number of entity components of the Chinese characters.

In the embodiment, an entity component of the Chinese character is set to be a standard entity component, and lengths of other entity components of the Chinese characters are 0.25-4 times longer than that of the standard entity component of the Chinese characters, so that characters of all proportions are formed. For example, if the standard entity component of the Chinese character is set to have a length of 4 cm, and other entity components of Chinese characters have lengths varying from 1 cm to 16 cm, such that all the Chinese characters can be formed.

In the embodiment, the connecting mechanism for connecting different entity components of the Chinese characters can be a nylon fastener, a magnet or a mortise and tenon joint structure, by which different entity components of the Chinese characters are connected. The entity components of the Chinese characters are connected through the adopted mortise and tenon joint structures which are provided with a mortise, a slot or a groove, or a protrusion or a groove for engagement. A rabbet, a mortise or a tenon groove can be adopted by part entity components of the Chinese characters to realize the connection between such entity components with linch pin, and specifically, the following structures can be adopted: a mortise and tenon joint using tenons of two different lengths, a mortise and tenon joint using dowel, dovetail joint, a haunch mortise and tenon joint, a mortise and tenon joint using a through supporting piece, a mortise and tenon joint using three sloped tenons, and a mortise and tenon joint with chuck tenon. The mortise and tenon joint is not only an ancient construction techniques, but a cultural patterns formed in the history. Through the separation, connection and insertion of members in the construction, the most suggestive and perceptive symbols in Chinese classical culture are materialized into a visual language of modern art that conforms to the Latin alphabet and brings the Chinese character to live by showing the spirit hidden inside Chinese character.

In the embodiment, part or all of the entity components of the Chinese characters are rotatable around their connection points when different entity components of the Chinese characters are connected.

Figure 1D:
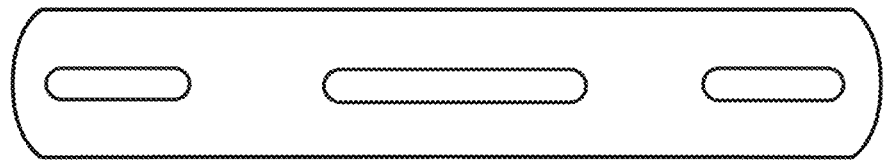
Figure 1E:
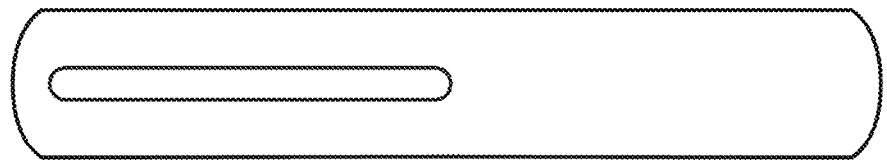
Figure 1F:
Figure 1G:
Figure 2A:
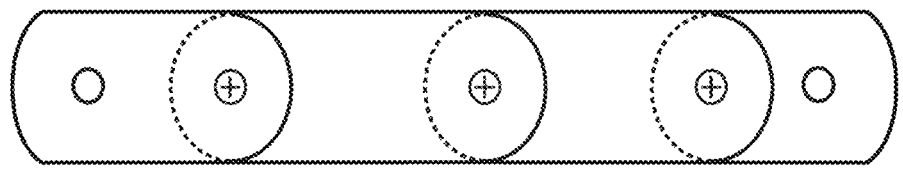
FIGS. 2a-2g are schematic diagrams of the entity components of Chinese characters according to another embodiment of the present invention.
Figure 2B:
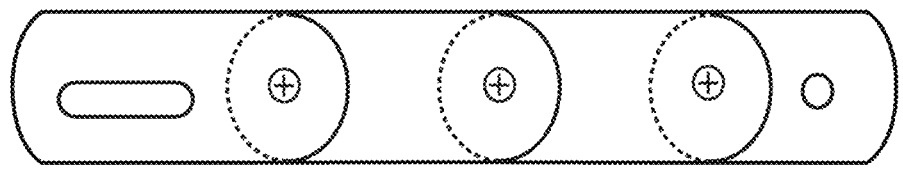
Figure 2C:
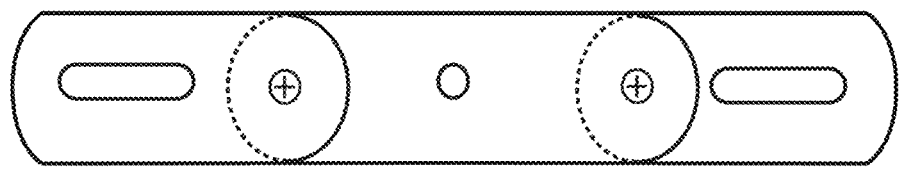
Figure 2D:
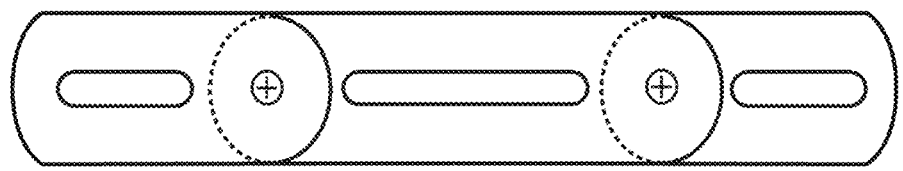
Figure 2E:
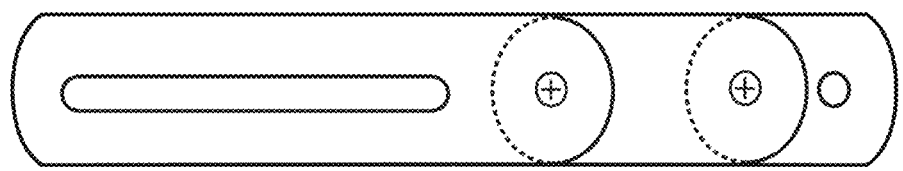
Figure 2F:
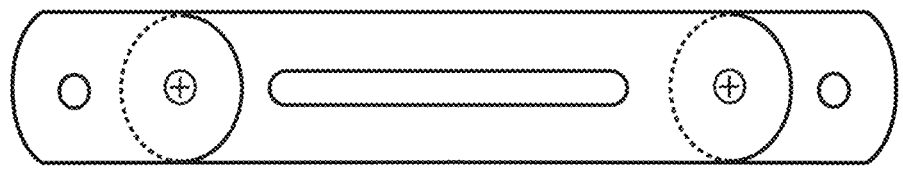
Figure 2G:
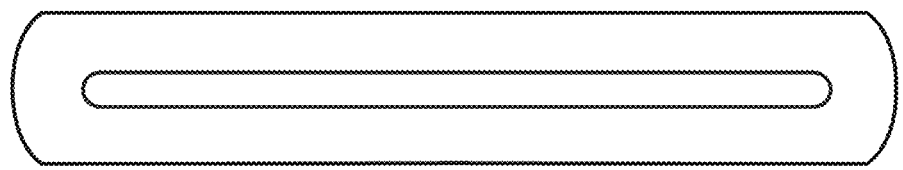
Figure 3A:
FIGS. 3a-3g and 4a-4g are schematic views of the entity components of the Chinese characters configured by different joining pieces.
Figure 3B:
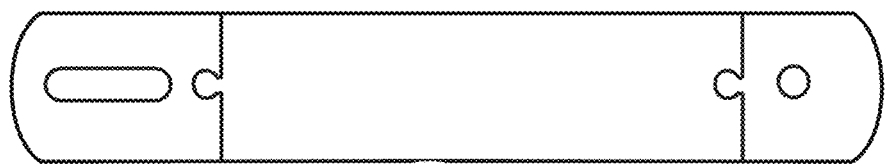
Figure 3C:
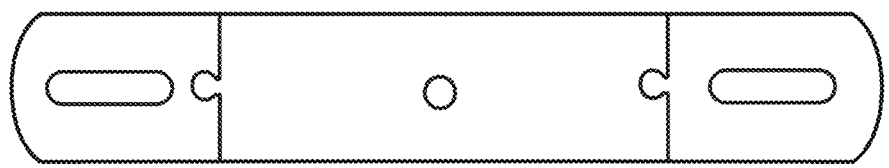
Figure 3D:
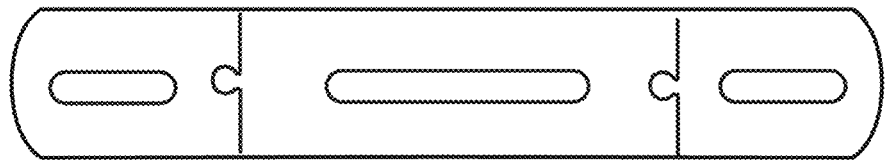
Figure 3E:
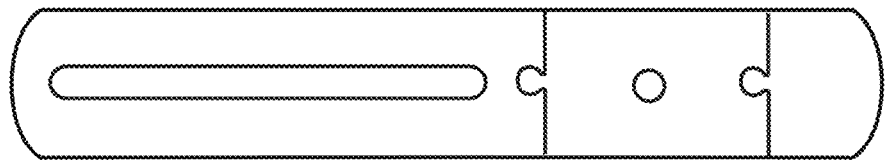
Figure 3F:
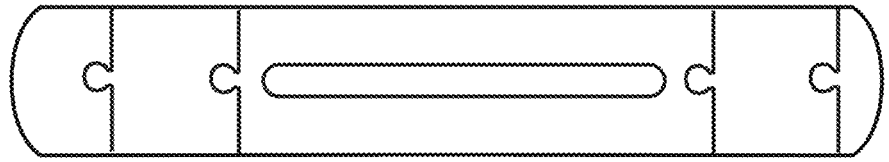
Figure 3G:
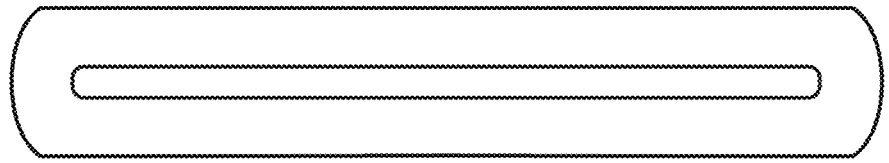
Figure 4A:
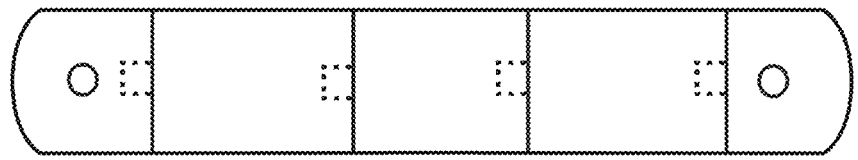
Figure 4B:
Figure 4C:
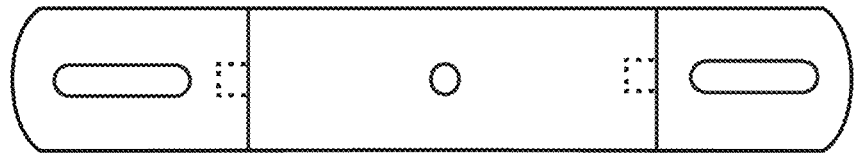
Figure 4D:
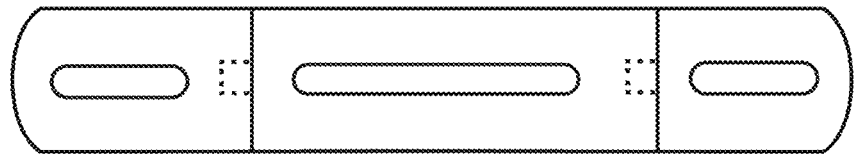
Figure 4E:
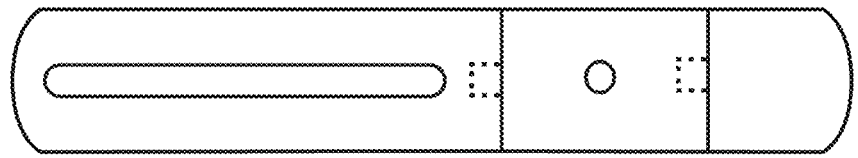
Figure 4F:
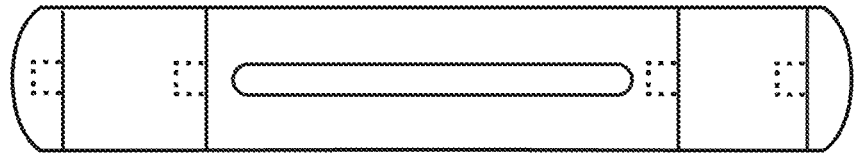
Figure 4G:
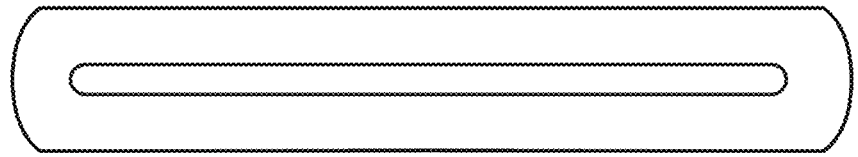

In an embodiment, when the middle and one end of the entity component of the Chinese character are provided with a mortise, a slot, a groove, a nylon fastener or a magnet, or when the middle and both ends of the entity component of the Chinese character are provided with a mortise, a slot, a groove, a nylon fastener or a magnet, the mortise, the slot, the groove and the nylon fastener the magnet can be integrated as one, shown in FIG. 1e, which realizes the diversification of the entity components of Chinese strokes.

In the embodiment, the entity components of the Chinese characters are two-dimensional or three-dimensional.

When the entity component of the Chinese character is two-dimensional, the mortise, the slot or the groove will penetrate such entity component, and the nylon fastener, the magnet and the groove or protrusion for engagement are arranged on the surface of the entity component.

When the entity component of the Chinese character is three-dimensional, the mortise, the slot or the groove can be arranged on the surface of such entity component and are carved into such entity component with a certain depth; or the mortise, the slot or the groove can be arranged on four sides of such entity component, or the mortise, the slot or the groove can be arranged on and penetrate two opposite sides of the entity component; the nylon fastener, the magnet and the groove or protrusion for engagement are arranged on at least one side of the three-dimensional entity component of the Chinese character. For the purpose of learning and application, the two-dimensional (or three-dimensional) Chinese character can be formed by arranging the two-dimensional (or three-dimensional) entity component of the Chinese character.

In the embodiment, a nail-shaped component can also be provided, and specifically being a metal nail, a plastic nail or a wood nail, and the two-dimensional entity component of the Chinese character and the three-dimensional entity component of the Chinese character may be connected and/or fixed by the nail-shaped component.

In the embodiment, a connecting bolt is further provided, and when the connecting mechanism is a mortise, a slot or a groove, the connecting bolt passes through the connecting mechanism of two or three entity components of the Chinese characters to connect these entity components together, and ends of the connecting bolt protrudes from or is flush with the entity components of the Chinese characters. The Chinese character formed by the connecting bolt can be easily hanged since the connecting bolt protrudes from the entity components of the Chinese characters. The connecting bolt comprises but is not limited to three forms. As shown in FIGS. 6a-6c, a symbol of the top surface of the connecting bolt is "–" in FIG. 6a, and a symbol of the top surface of the connecting bolt is "+" in FIG. 6b, and the top surface of the connecting bolt is a hexagonal shape in FIG. 6c, which achieves the connections of different levels.

Figure 5A:
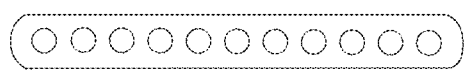
FIGS. 5a-5g are schematic diagrams showing the entity components of Chinese characters and a connection thereof according to yet another embodiment of the present invention.
Figure 5B:
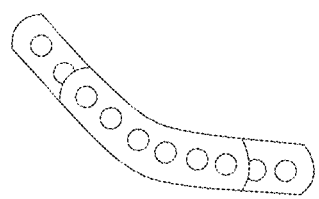
Figure 5C:
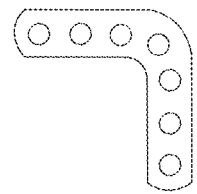
Figure 5D:
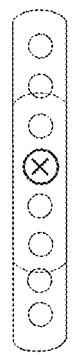
Figure 5E:
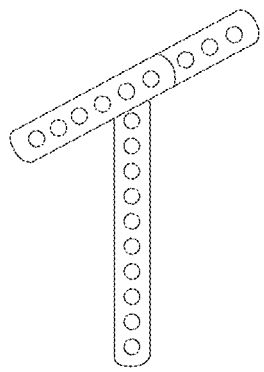
Figure 5F:
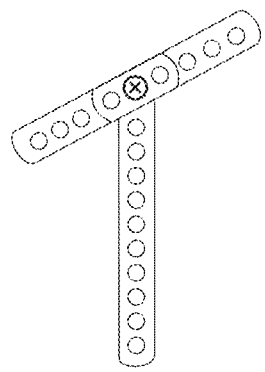
Figure 5G:
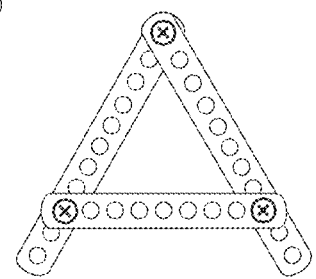

The fourth structure is shown in FIGS. 5a-5c, the connecting mechanisms which are equally or unequally spaced and extend from one end to the other end of the entity component for connecting different entity components of Chinese characters. In the embodiment, the connecting mechanism can be a mortise, a magnet or a nylon fastener, and also could be a protrusion on one end and a mortise on the other end. FIGS. 5d-5g are the schematic diagrams of the connection between different entity components of the Chinese characters, where FIG. 5e shows the joining of the entity components, and the connecting mechanisms shown in FIGS. 5d-5g are mortises which are connected by the connecting bolt, and the two Chinese character structuring members connected by the connecting bolt, as shown in FIGS. 5d-5f, are rotatable.

In the embodiment, the entity components of the Chinese characters are made of wood, plastic, metal, glass or any combination thereof. The various materials help to form the mortise and tenon joint structures and diversify the display.

A system of Chinese characters formed by mortise and tenon joint structures is provided in the present invention. Part or all of the capital Latin letters and/or part or all of the lowercase Latin letters are squared according to the proportions of Chinese characters, and part or all of the squared strokes of the Chinese characters are stacked, overlapped or inserted with each other at the mortise and tenon joint of the strokes to form the mortise and tenon joint structures of Chinese characters for the Latin letters; and/or part or all of the Arabic numerals of 0-9 are squared according to the proportions of Chinese characters, and part or all of the squared strokes of the Chinese characters are stacked, overlapped or inserted with each other at the mortise and tenon joint of the strokes to form the mortise and tenon joint structures of Chinese characters for the Arabic numbers; and/or part or all of Chinese numerals of 1-10 are squared according to the proportions of Chinese characters, and part or all of the squared strokes of the Chinese characters are stacked, overlapped or inserted with each other at the mortise and tenon joint of the strokes to form mortise and tenon joint structures for Chinese numerals. In the embodiment, the squared strokes of the Chinese characters are entity components for constituting the Chinese character structures.

The system of Chinese characters formed by mortise and tenon joint structures for the Latin letters and numerals is provided in the present invention, which converts the shape of a Latin letter or a numeral into a square shape similar to the Chinese character, which realizes the construction and display of the modern Chinese character.

Figures 14, 15:
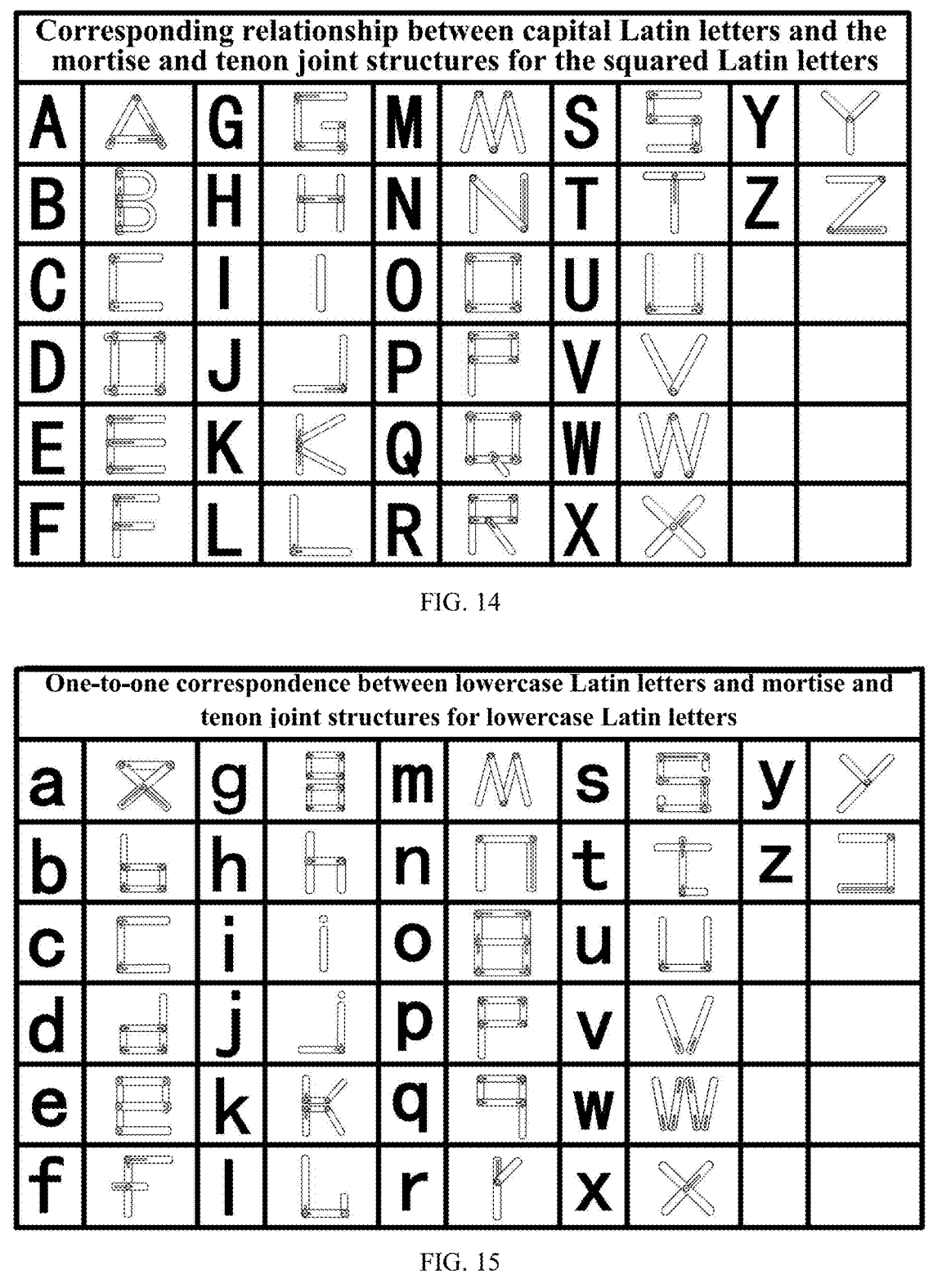

In some embodiments, the mortise and tenon joint structures of the Chinese characters for the squared capital Latin letters are shown in FIG. 14. The mortise and tenon joint structures of the Chinese characters for the squared lowercase Latin letters are shown in FIG. 15. It can be seen from FIG. 15 that the mortise and tenon joint structures of the Chinese characters for the capital Latin letters and the lowercase Latin letters are obtained through the mortise and tenon connection, and the radicals for forming the Chinese character can be formed by part or all of the mortise and tenon joint structures of the Chinese characters, such that all the Chinese characters can be formed.

In the embodiment, part or all of strokes of the ancient Chinese characters are squared according to the proportions of the Chinese characters, and part or all of the squared strokes of the Chinese characters are stacked, overlapped or inserted with each other at the mortise and tenon joint of the strokes to form mortise and tenon joint structures for the ancient Chinese characters.

In the embodiment, a stroke means that the writing direction is oriented in one direction with no angular bending; or the writing direction is bent with at least one angle.

In some embodiments, a first connecting component and a second connecting component are arranged on the mortise and tenon joint structures of the Chinese characters. Two squared strokes of the mortise and tenon joint structure of the same Chinese character are joined by the first connecting component, and the two squared strokes can rotate around the joint center of the first connecting component, which can realize the configuration and the display of the different Chinese characters by mirroring, flipping and rotation, etc. The mortise and tenon joint structures of the different Chinese characters are in fixed connection by the second connecting component.

In some embodiments, a third connecting component is further provided to connect a structure formed by the second connecting component with other mortise and tenon joint structures of the different Chinese characters in fixed connection. The configuration and the display of the complicated Chinese characters are realized by the third connecting component.

In some embodiments, the first connecting component, the second connecting component and the third connecting component are a recess or a protrusion for engaging a mortise, a slot, a groove, a magnet or a nylon fastener. In the embodiment, a nail-shaped component is further provided to connect and/or fix the Chinese character structures and the entity components of the Chinese character structures, so that diverse combination can be realized.

For the specific connecting component, the bolt shown in FIGS. 6a-6c can be used as the connecting component. When the bolt is used as the connecting component, the symbol of the top surface of the first connecting component is "−", as shown in FIG. 5a; the symbol of the top surface of the second connecting component is "+", as shown in FIG. 5b; the top surface of the third connecting component is a hexagonal symbol, as shown in FIG. 5c, which achieves different levels of connecting.

Figure 8:
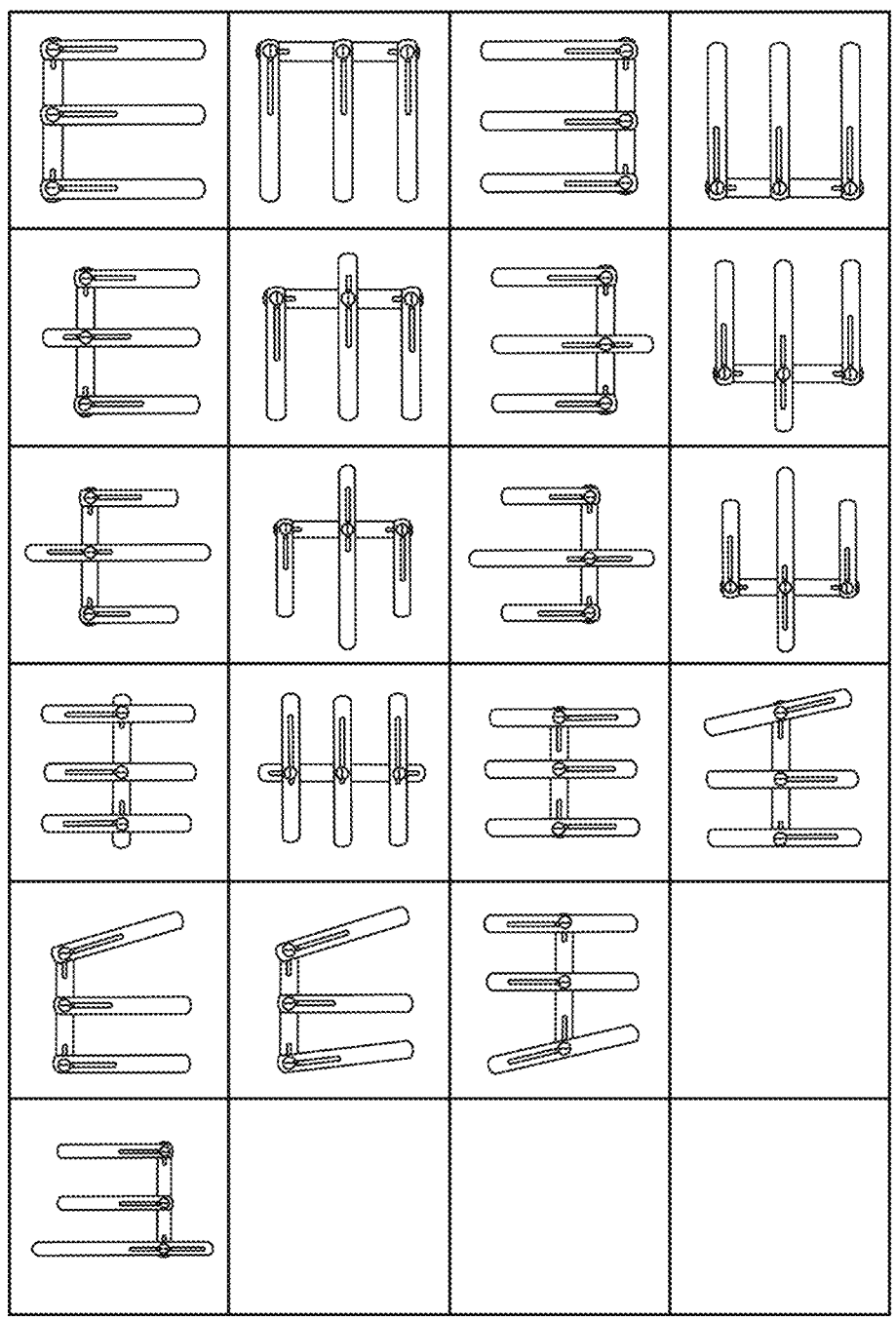
FIG. 8 is a schematic diagram of variants of the mortise and tenon joint structure of the Chinese characters formed by the entity components of the Chinese characters in FIG. 7.

As shown in FIG. 7, the mortise and tenon joint structure of the Chinese character of the letter E formed by the entity components of the Chinese characters, which is the structuring member of the Chinese character, is formed with four entity components of the Chinese characters, where three of the entity components of the Chinese character using the structure shown in FIG. 1e are connected with the one entity component of the Chinese character using structure shown in FIG. 1d through the first bolt. As shown in FIG. 8, the variants of the mortise and tenon joint structure of the Chinese character of the letter E are formed by different entity components of the Chinese characters, which have three entity components of the Chinese character with different lengths using the structure shown in FIG. 1e and one entity component of the Chinese character using structure shown in FIG. 1d. As shown in the drawings, the core of the present invention is that radicals of Chinese characters are formed by moving and rotating the connecting mechanism of the mortise and tenon joint structures to form all Chinese characters. For example, the mortise and tenon joint structure of the Chinese character in the first column of the first row may be the lower part of the ancient Chinese character "仑"; the mortise and tenon joint structure of the Chinese character in the third column of the first row may be the lower part of the Chinese character "雪"; the mortise and tenon joint structure of the Chinese character in the fourth column of the first row may be the lower part of the ancient Chinese character "屮"; the mortise and tenon joint structure of the Chinese character in the first column of the second row may be the lower parts of the Chinese characters "虐", "瘧" and "疟"; the mortise and tenon joint structure of the Chinese character in the second column of the second row may be the lower part of the ancient Chinese character "雨"; the mortise and tenon joint structure of the Chinese character in the second column of the third row may be the right part of the Chinese character "帅"; the mortise and tenon joint structure of the Chinese character in the third column of the third row may be the top part of the Chinese character "君" the mortise and tenon joint structure of the Chinese character in the third column of the second row may be the top part of the Chinese character "隶"; the mortise and tenon joint structure of the Chinese character in the third column of the second row may be the top part of the Chinese character "出"; the mortise and tenon joint structure of the Chinese character in the first column of the fourth row may be the Chinese character "丰"; the mortise and tenon joint structure of the Chinese character in the third column of the fourth row may be the Chinese character "王"; the mortise and tenon joint structure of the Chinese character in the second column of the fourth row may be the top part of the Chinese character "带"; the mortise and tenon joint structure of the Chinese character in the fifth column of the third row may be the left part of the Chinese character "理"; the mortise and tenon joint structure of the Chinese character in the fourth column of the fourth row may be the right part of the Chinese character "任"; the mortise and tenon joint structure of the Chinese character in the first column of the fifth row may be the Chinese character "印"; the mortise and tenon joint structure of the Chinese character in the first column of the sixth row may be the Chinese character "录".

When configuring Chinese characters, different mortise and tenon joint structures of the Chinese characters may be connected to each other through a connecting component, or may be placed side by side without being connected. For example, the left and right parts of the Chinese character "任" are not connected, which means different mortise and tenon joint structures of the Chinese characters only need to be placed in parallel according to the writing rules of Chinese characters.

In some embodiments, when the connecting bolt is used as the connecting component in the mortise and tenon joint structures for the Latin letters or the numerals, part or all of the squared strokes of the Chinese characters are provided with a straight slot on the connecting component, and a joint between the squared strokes of the Chinese character is movable along and/or rotatable around the straight slot of the squared strokes of the Chinese character connected thereto, so that some squared strokes of the Chinese characters are moveable and the configuration and display of different Chinese characters are realized.

In some embodiments, an extra stroke member is further provided. The extra member is detachably connected to the squared strokes of the Chinese characters, and end faces of the extra stroke member and the squared strokes of the Chinese characters are the same in size. The configured Chinese characters are conformed to the commonly used Chinese character structure through the extra stroke member.

Figure 9A:
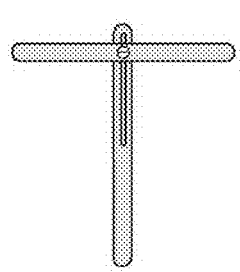
FIGS. 9a-9e show a configuration example of a Chinese character according to an embodiment of the present invention.
Figure 9B:
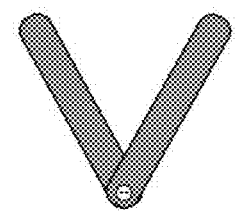
Figure 9C:
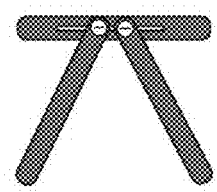
Figure 9D:
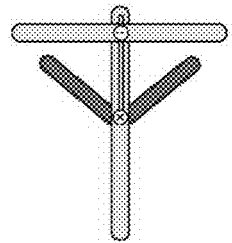
Figure 9E:
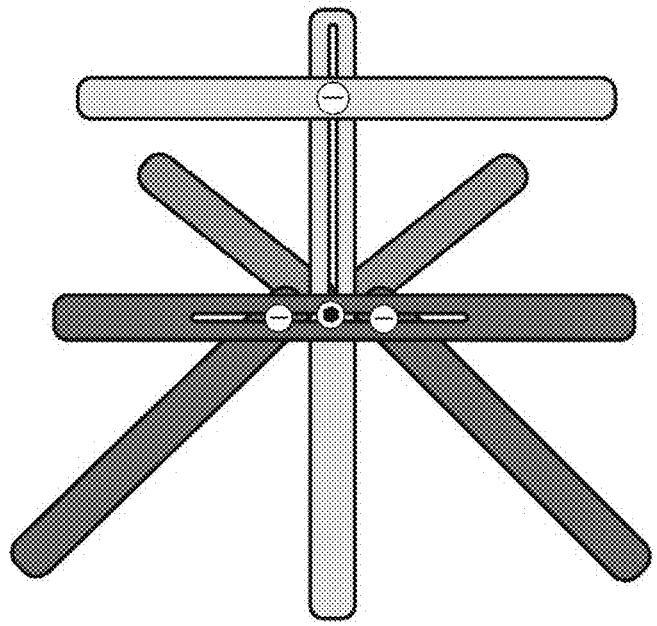

In the embodiment, the Chinese character "来" shown in the FIGS. 9*a*-9*e* is formed by three mortise and tenon join structures of the Chinese characters corresponding to three capital Latin letters T, V and K shown successively in FIGS. 9*a*-9*c*. In the mortise and tenon join structure of the Chinese character corresponding to the capital Latin letter T shown in the FIG. 9 *a*, a through slot is provided on the vertical squared stroke of the Chinese character from the top to the middle, and the first connecting component of the mortise and tenon join structure of the Chinese character corresponding to the capital Latin letter V is connected to the bottom of the slot of the vertical squared stroke of the Chinese character corresponding to the capital letter T; and the mortise and tenon join structure of the Chinese character corresponding to the capital Latin letter K rotated clockwise by 90° is connected to the bottom end of the slot of the vertical squared stroke of the Chinese character corresponding to the capital Latin letter T through the third connecting component. Only one of the these connecting components is needed when configuring the Chinese character since the connecting components of the mortise and tenon join structure of the Chinese character corresponding to the capital Latin letter V and the mortise and tenon join structure of the Chinese character corresponding to the capital Latin letter K are overlapped. In the embodiment, the two squared strokes of the mortise and tenon join structure of the Chinese character corresponding to the capital Latin letter T are connected by the first connecting component which is a first bolt shown in FIG. 6*a*; and the mortise and tenon join structure of the Chinese character corresponding to the capital Latin letter T is connected to the mortise and tenon join structure of the Chinese character corresponding to the capital Latin letter V by the second connecting component which is a second bolt shown in FIG. 6*b*; and the mortise and tenon join structure of the Chinese character corresponding to the capital Latin letter T, the mortise and tenon join structure of the Chinese character corresponding to the capital Latin letter V and the mortise and tenon join structure of the Chinese character corresponding to the capital Latin letter K are connected via the third connecting component which is a third bolt shown in FIG. 6*c*, so that the mortise and tenon join structure of the Chinese character "来" is formed through the above processes.

A method for inputting Chinese characters using mortise and tenon joint structures for Latin letters or numerals is provide. All strokes of the Latin letters or the numeral are squared according to proportions of Chinese characters, and part or all of the squared strokes are stacked, overlapped or inserted at a joint to form the mortise and tenon joint structures of the Chinese characters. The Latin letters are in one-to-one correspondence with the mortise and tenon joint structures for the Latin letters, and/or numerals are in one-to-one correspondence with the mortise and tenon joint structures for the numerals. The Latin letters comprise the capital Latin letters and/or the lowercase Latin letters. The corresponding relationship between the capital Latin letters and the mortise and tenon joint structures for the Latin letters is shown in FIG. 10.

Figures 10, 11:
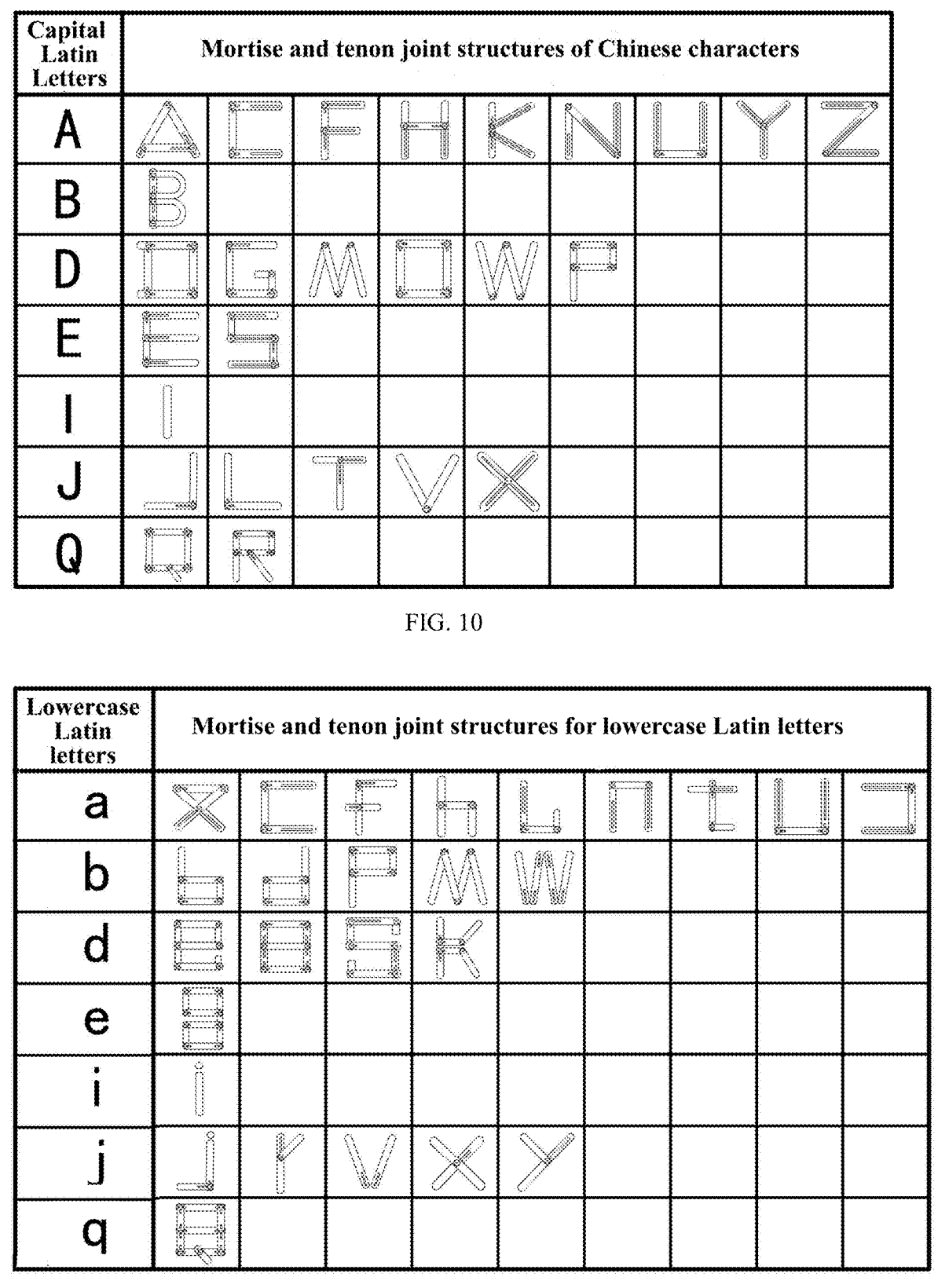

The corresponding relationship between the lowercase Latin letters and the mortise and tenon joint structures for the Latin letters is shown in FIG. 11.

Figure 16B:
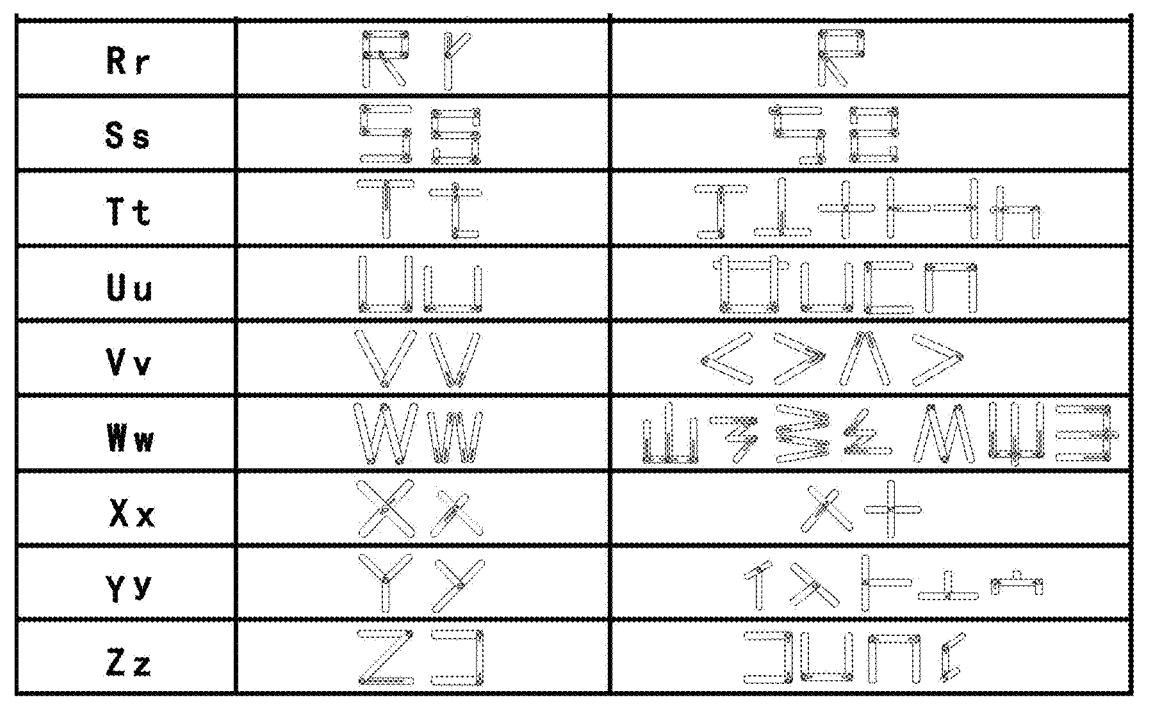

The corresponding relationship among the Latin letters, the mortise and tenon joint structures for the Latin letters and variants of the mortise and tenon joint structures for the Latin letters is shown in FIGS. 16A and 16B.

The corresponding relationship between Arabic numerals and the mortise and tenon joint structures for the Arabic numerals is shown in FIG. 12.

The corresponding relationship between Chinese numerals and the mortise and tenon joint structures for the Chinese numerals is shown in FIG. 13.

The Chinese characters are input using a Chinese character structures and a mirror image, a reverse image and a rotation structure thereof.

The Chinese characters are conveniently and quickly input and displayed by the input method, which breaks the barrier among the symbol systems and provides new relationships among the letters, numerals and Chinese characters. The (Gao's) artistic movable font with the mortise and tenon joint structure of the Chinese character of the squared Latin letters is invented for the purpose of inputting and learning Chinese character, i.e., shapes of strokes of the Chinese characters are converted into that of Latin letters to help students whose first language is Latin to enhance their memory in learning Chinese, providing them with letter basis for memory.

In this embodiment, after inputting the capital Latin letters, the lowercase Latin letters, the Arabic numerals and the Chinese numerals, the displayed mortise and tenon joint structures of the Chinese characters comprise part or all the mortise and tenon joint structures of the Chinese characters in FIGS. 10-12 and 16A-16B corresponding to the input symbols.

In the embodiment, a Chinese character structure corresponding to a capital Latin letter A is displayed When inputting one of capital Latin letters C, F, H, K, N, U, Y, and Z;

A mortise and tenon joint structure of a Chinese character corresponding to a capital Latin letter D is displayed When inputting one of capital Latin letters G, M, O, W, and P;

A mortise and tenon joint structure of a Chinese character corresponding to a capital Latin letter E is displayed when input a capital Latin letters S;

A mortise and tenon joint structure of a Chinese character corresponding to a capital Latin letter J is displayed When inputting one of capital Latin letters L, T, V, and X;

A mortise and tenon joint structure of a Chinese character corresponding to a capital Latin letter Q is displayed when input a capital Latin letters R;

A mortise and tenon joint structure of a Chinese character corresponding to a lowercase Latin letter a is displayed When inputting one of lowercase Latin letters c, f, h, 1, n, t, u and z;

A mortise and tenon joint structure of a Chinese character corresponding to a lowercase Latin letter b is displayed When inputting one of lowercase Latin letters d, p, m and w;

A mortise and tenon joint structure of a Chinese character corresponding to a lowercase Latin letter e is displayed When inputting one of lowercase Latin letters o, s and k; and A mortise and tenon joint structure of a Chinese character corresponding to a lowercase Latin letter j is displayed When inputting one of lowercase Latin letters r, v, x and y.

Take the capital Latin letters A, C, F, H, K, N, U, Y and Z for example, the mortise and tenon joint structure corresponding to the input letter will be displayed first, and followed by the mortise and tenon joint structures corresponding to the order of the input letters. For instance, when the input letter is N, the mortise and tenon joint structures corresponding to the letters N, U, Y, Z, A, C, F, H, K will be displayed in order.

In the embodiment, the proportions of the mortise and tenon joint structures and the deformations thereof are set according to the Chinese character structure.

In the embodiment, different Chinese character structures of Chinese characters are different in color, which facilitates the recognition for the configuration of Chinese characters and the learning for Chinese.

In the embodiment, taking the word "来" as an example, the word "来" is obtained by inputting capital Latin letters T, V and K, where the mortis and tenon joint structure of K is rotated clockwise by 90°.

In this embodiment, FIGS. 10-12 and 16A-16B only show part of the basic mortise and tenon joint structures of the Chinese characters, and a button for controlling the mirror image rotations of the mortise and tenon joint structures of the Chinese characters is further provided in the present invention to control the lengths of the entity components of the Chinese character strokes; and a button for controlling movement and rotation between different entity components of the Chinese character strokes is further provided in the present invention. The methods in the prior art are adopted to control the length, the movement and the rotation of the entity components.

In some embodiments, the Chinese characters associated with multiple interpretations thereof are stored in a database; when inputting the Chinese characters or any of the interpretations, the Chinese characters and the interpretations thereof are di splayed on a display.

In some embodiments, the initial of the Chinese pinyin corresponding to a Chinese character is input before the first mortise and tenon joint structure of the Chinese character corresponding to the Chinese character, or between the mortise and tenon joint structures of the Chinese characters next to the mortise and tenon joint structures of the Chinese characters corresponding to the Chinese character, or after the last mortise and tenon joint structure of the Chinese character corresponding to the Chinese character. For example, when inputting the Chinese character "甫", the corresponding Latin letters are "ADAD", or "j dad", or "YONO", or "yono", or the corresponding numerals are "7020" or "二川三川". The mortise and tenon joint structure of the Chinese character is input according to FIG. 10 when choosing "ADAD"; the mortise and tenon joint structure of the Chinese character is input according to FIG. 11 when choosing "jdad"; the mortise and tenon joint structure of the Chinese character is input according to FIGS. 16A-16B when choosing "YONO" or "yono"; the mortise and tenon joint structure of the Chinese character is input according to FIG. 12 when choosing "7020"; the mortise and tenon joint structure of the Chinese character is input according to FIG. 13 when choosing "二川三川".

In the present invention, the structures among the Chinese character strokes are designed to be detachable and rotatable, and the mortise and tenon joint structures are designed to be movable and rotatable within a fixed range, such that various Chinese character structure can be formed as needed. The Chinese characters with special requests can be separated into squared Latin letters and/or squared numerals which helped the deformable Chinese character to line with the visual logic and visual law.

A movable connecting bolt provided in the connections of the Latin letter strokes allows the Latin letter strokes to rotate and deform within a fixed moving range to form the requested Chinese character, which greatly reduced the number of coding roots. This new Chinese character structuring mode will change the traditional concept of understanding and writing of Chinese characters.

The concise root table of the Chinese input method of the present invention has a profound significance of changing the mindset of learning, reading, writing and inputting of Chinese characters. A new theory of teaching and inputting Chinese characters is established by changing the relationship between Latin letters and Chinese characters, which provides vitality to the abstract Chinese character strokes. The squared Latin letters are formed by the undestroyed Chinese character strokes, such as dots, vertical strokes, horizontal strokes, right-falling strokes, throw strokes, turning strokes.

In the present invention, the terms "in an embodiment", "in some embodiments", "example", "in a specific example", or "in some examples" and the like indicate that specific features, a structures, materials or characteristics described in the embodiment are included in at least one embodiment or example of the present invention and the same term does not necessarily mean the same embodiment or example. Furthermore, the particular features, structures, materials, or characteristics described may be combined in a suitable manner in the embodiments or examples.

Although some embodiments has been described in the present invention, it should be understood by those skilled in the art that modifications, changes, substitutions and variations of the embodiments may be made without departing from the spirit and scope of the invention. The scope of the invention is defined by the appended claims and equivalents thereof.

We claim:

1. A method for inputting Chinese characters, comprising:
   modeling Latin letters comprising capital Latin letters and lowercase Latin letters by using a plurality of building members having the same or different configurations;
   stacking, overlapping and inserting the plurality of building members having the same or different configurations to form mortise and tenon joint structures;
   de-structuring the Chinese characters such that each of the Chinese characters consists of one or more radicals; and
   inputting the Chinese characters by using the mortise and tenon joint structures and variants thereof that correspond to the radials of the Chinese characters; wherein the variants of the mortise and tenon joint structures are formed by shift or rotation or combination of shift and rotation of the mortise and tenon joint structures;

wherein a first connector and a second connector are arranged on the mortise and tenon joint structures; two building members of one of mortise and tenon joint structures are joined by the first connector, and are rotatable around a joint center of the first connector; and two mortise and tenon joint structures are in fixed connection by the second connector;

wherein a one-to-one correspondence between the capital Latin letters and the mortise and tenon joint structures for the capital Latin letters is shown in FIG. 14; and a one-to-one correspondence between the lowercase Latin letters and the mortise and tenon joint structures for the lowercase Latin letters is shown in FIG. 15.

2. The method of claim 1, wherein the Chinese characters associated with multiple interpretations are stored in a database; when inputting the Chinese characters or any of the interpretations, the interpretations and the Chinese characters are displayed on a display.

3. The method of claim 1, wherein any one of the building members is straight or bent with at least one angle.

4. The method of claim 1, wherein a third connector is further provided to connect a structure formed by the second connector with other mortise and tenon joint structures.

5. The method of claim 4, wherein the first connector, the second connector and the third connector each are a recess or a protrusion for engaging a mortise, a slot or a groove; or the first connector, the second connector and the third connector each are a connecting bolt, a magnet or a nylon fastener; and a nail is further provided to connect or fix the mortise and tenon joint structures and the building members of the mortise and tenon joint structures.

6. The method of claim 5, wherein when the connecting bolt is used as a connector in the mortise and tenon joint structures, at least one of the building members of the mortise and tenon joint structures is provided with a straight slot, and the connecting bolt is movable along or rotatable around the straight slot of the at least one of the building members of the mortise and tenon joint structures.

7. The method of claim 1, wherein at least one of the building members is configured with a slot extending from a length of the one of the building members without exceeding two ends; or two of the building members are connected end-to-end by the first connector, and are rotatable around a joint where the two building members are connected.

8. The method of claim 1, wherein at least one of the building members is configured with one or more slots having the same or different lengths.

9. The method of claim 1, wherein at least one of the building members is configured with one or more mortises.

* * * * *